US006251013B1

(12) United States Patent
Bennett

(10) Patent No.: US 6,251,013 B1
(45) Date of Patent: Jun. 26, 2001

(54) SLOT MACHINE GAME WITH RANDOMLY DESIGNATED SPECIAL SYMBOLS

(75) Inventor: Nicholas Luke Bennett, Manly Valve (AU)

(73) Assignee: Aristocrat Technologies Australia Pty Ltd., New South Wales (AU)

( * ) Notice: Subject to any disclaimer, the term of this patent is extended or adjusted under 35 U.S.C. 154(b) by 0 days.

(21) Appl. No.: 09/259,907

(22) Filed: Feb. 26, 1999

(30) Foreign Application Priority Data

Feb. 27, 1998 (AU) .................................................. PP2064

(51) Int. Cl.[7] ..................................................... G06F 17/34
(52) U.S. Cl. .......................... 463/13; 463/20; 273/143 R
(58) Field of Search ................................ 463/12, 13, 20; 273/143 R, 138.2

(56) References Cited

U.S. PATENT DOCUMENTS 5,332,228 * 7/1994 Schultz ................................ 273/292
5,449,173 * 9/1995 Thomas et al. .................. 273/143 R
5,697,843 * 12/1997 Manship et al. ........................ 463/20
5,772,506 * 6/1998 Marks et al. ........................... 463/13
5,848,932 * 12/1998 Adams .................................. 463/20

* cited by examiner

*Primary Examiner*—Benjamin H. Layno
(74) *Attorney, Agent, or Firm*—Rosenman & Colin, LLP

(57) ABSTRACT

A gaming machine having a display and game control, the game control being arranged to play a game wherein a plurality of symbols are randomly selected from a predetermined set of symbols and displayed in rows on the display and if a winning combination of symbols results, the machine pays a prize. In a first aspect, a triggering event invokes a game feature in which a sprite randomly designates one or more of the symbols displayed on the display to be treated as special symbols for that particular game and a prize is awarded for any winning combinations formed with one or more of the special symbols. Embodiments of the special symbol include a wild card symbol and a scatter symbol. In a second aspect, the sprite designates the win meter or the credit meter, causing the amounts shown on the win meter and credit meter to increase.

14 Claims, 9 Drawing Sheets

SLOT MACHINE GAME WITH RANDOMLY DESIGNATED SPECIAL SYMBOLS

BACKGROUND OF THE INVENTION (a) Field of the Invention

The present invention relates to gaming machines of the type arranged to play a game of poker, and in particular the invention provides an improvement to a game played on such a machine.

Players who regularly play gaming machines frequently tire of particular games. It therefore becomes desirable for gaming machine manufacturers to come up with innovative game features that add interest to the games, thereby keeping the players amused and willing to continue playing.

(b) Description of the Prior Art

Gaming or poker machines have been well-known in the state of New. South Wales for many years and have more recently gained considerable popularity throughout Australia, with quite substantial amounts of money being wagered on these machines. There is a growing tendency for State Governments to legalise the use of gaming machines by licensing operators, with resulting revenue gains through license fees and taxation of monies invested. The licensed operation of gaming machines is the subject of State legislation and regulation. This regulation almost always dictates a minimum percentage payout for a gaming machine. For example, the regulatory controls may ensure a minimum of 85% of monies invested must be returned as winnings. Manufacturers of gaming machines must therefore design their machines around these regulatory controls.

With the growth that has occurred in the gaming machine market there is intense competition between manufacturers to supply the various existing and new venues. When selecting a supplier of gaming machines, the operator of a venue will often pay close attention to the popularity of various games with their patrons. Therefore, gaming machine manufacturers are keen to devise games which are popular with players, as a mechanism for improving sales.

Many varied strategies have been tried in the past to make games more enticing to players. For example, in the commonly-known "double-up" feature a player is provided with the option of risking the winnings of a game in a double-or-nothing mode by gambling it on a subsequent and often different game, such as whether a red or black card will be the next card drawn.

Other techniques adopted in the past have been to provide complexity in the numbering and combinations of indicia which would result in a win, thereby hoping to convince the player that there is a greater chance of winning and keep their interest in a particular game.

SUMMARY OF THE INVENTION

In a first aspect, the present invention consists in a gaming machine having display means and game control means, the game control means being arranged to play a game wherein a plurality of symbols are randomly selected from a predetermined set of symbols and displayed in rows on the display means, and if a winning combination of symbols results, the machine pays a prize, the game being characterised in that upon the occurrence of a predetermined triggering event, a game feature is invoked wherein a sprite randomly designates one or more of the symbols displayed on the display means to be treated as special symbols for that particular game and a prize is awarded for winning combinations formed with one or more of the special symbols.

The sprite may designate special symbols by touching or pointing to each symbol individually or to a group of symbols generally. Alternatively, the sprite may touch or point to one symbol, thereby designating every occurrence of the symbol on the display means as being a special symbol.

The triggering event may be the random display of one or more particular symbols in a particular arrangement on the display means.

Optionally, the triggering event may instead be a separate random prompt unrelated to the symbols displayed on the display means.

In a first embodiment, there is one special symbol which is a wild card symbol, and a prize is awarded for a winning combination formed with the wild card symbol, wherein the symbols in the winning combination are located in the same horizontal row as the wild card symbol.

In a second embodiment, there is one special symbol which is a scatter symbol, and a prize is awarded for each winning combination formed with the scatter symbol, wherein the symbols in each of the winning combinations are located in separate columns and may be scattered over any of the rows.

In a third embodiment, pairs of symbols are randomly selected to be special symbols and the symbols in each pair are swapped with each other.

In a fourth embodiment, the special symbols are all of those symbols appearing on a randomly-chosen simulated rotatable reel, and the simulated reel is made to appear to rotate a random number of times. The simulated rotatable reel may consist of a vertical column of symbols or a horizontal row of symbols.

In a fifth embodiment, the special symbols are the symbols occurring in a randomly-chosen row, and any winning combination formed in that row during the next game played will be awarded a prize which is double or triple the value of the normal prize for that winning combination.

In a second aspect, the present invention consists in a gaming machine having display means and game control means the game control being means arranged to play a game wherein a plurality of symbols are randomly selected from a predetermined set of symbols and displayed on the display means, and if a winning combination of symbols results, the machine pays a prize, the game being characterised in that upon the occurrence of a predetermined triggering event, a game feature is invoked wherein a sprite designates a win meter for indicating winnings, or a credit meter for indicating the amount of available credit, and increases the amount shown on both the win meter and credit meter.

In one embodiment, the sprite randomly doubles or triples the amount shown on the win meter.

The present invention is applicable to video gaming machines of the traditional poker machine style (also known as slot machines or fruit machines) in which the display means comprises a video simulation of a set of rotatable reels, each carrying a plurality of symbols. The invention is equally applicable to video draw poker machines in which a poker hand is displayed on the screen, the cards of the hand being selected from a standard 52 or 53 card deck.

The sprite may be a representation of a symbol or character which moves across the display means and touches or otherwise designates the special symbol.

In a particular embodiment the sprite depicts a fairy holding a wand and the symbols touched by the wand become the special symbols.

BRIEF DESCRIPTION OF THE DRAWINGS

An embodiment of the invention will now be described, by way of example with reference to the accompanying drawings, in which.

DETAILED DESCRIPTION OF THE PREFERRED EMBODIMENTS

In the following detailed description the methodology of the embodiments will be described, and it is to be understood that it is within the capabilities of the non-inventive worker in the art to introduce the methodology on any standard microprocessor-based gaming machine by means of appropriate programming.

Figure 1:
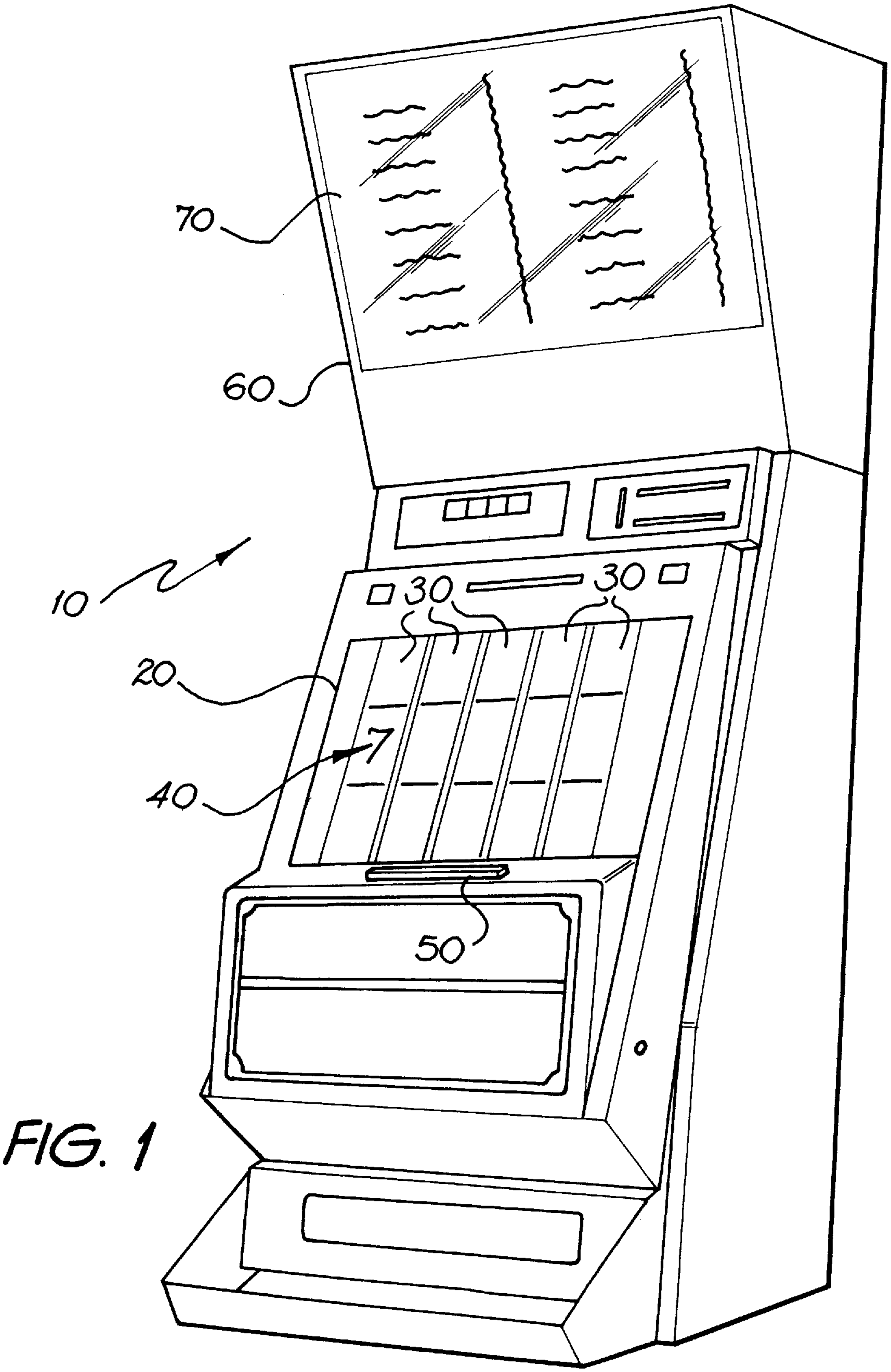
FIG. 1 illustrates a gaming machine with a video simulation of a rotating reel display incorporating a first embodiment of the invention.

Referring to FIG. 1, the first embodiment of the invention is illustrated in which a slot machine 10, of the type having a video display screen 20 which displays a plurality of rotatable reels 30 carrying symbols 40, is arranged to pay a prize on the occurrence of a predetermined symbol or combination of symbols.

In the slot machine 10, the game is initiated by a push button 50, however, it will be recognised by persons skilled in the art that this operating mechanism might be replaced by a pull handle or other type of actuator in other embodiments of the invention. The top box 60 on top of the slot machine 20 carries the artwork panel 70 which displays the various winning combinations for which a prize is paid on this machine.

Figure 2:
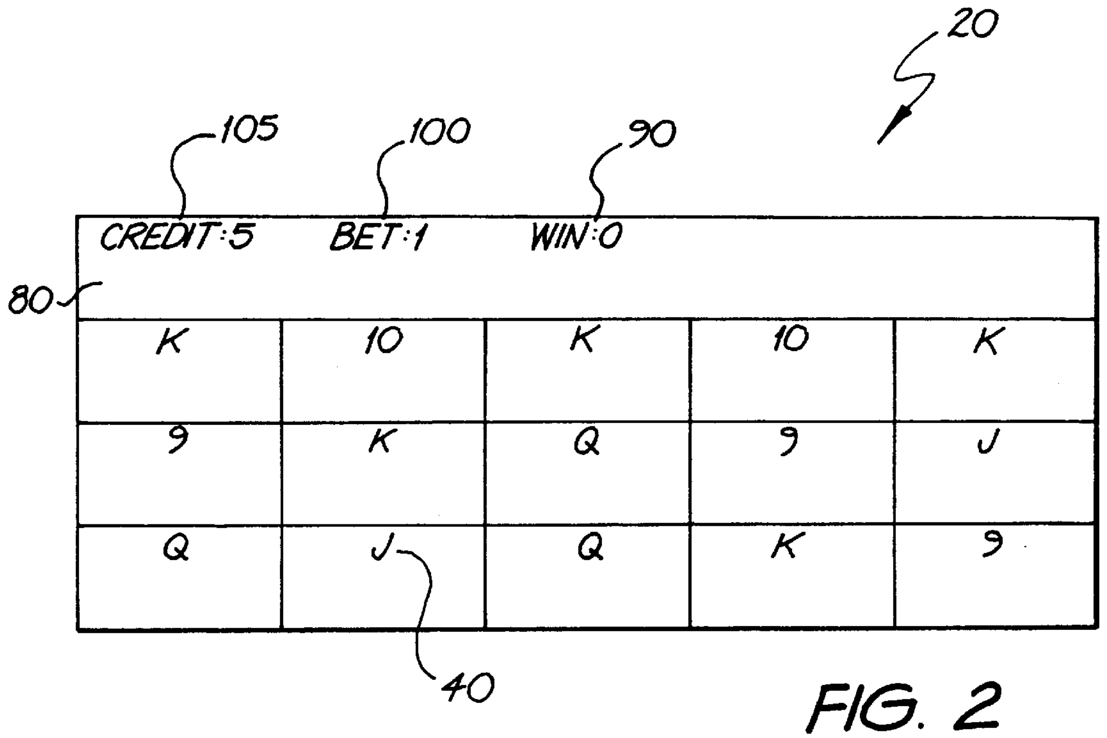
FIG. 2 is a video display as seen before a feature game is invoked.

FIG. 2 shows an example of a video display which has three rows and five columns of symbols 40. At the top edge 80 of the screen 20 there is a win meter 90, a bet indicator 100, and a credit meter 105. The win meter 90 indicates the amount of money won on the last game played, the bet indicator shows the amount currently being bet by a player on the game, and the credit meter shows the total amount of money owing to the player as a result of winnings and money inserted into the machine. All amounts of money are expressed on the video display in terms of units, where one unit is the minimum amount of money required to play the game. For example, one unit may be 20 cents.

The main part of the game played on this machine is a relatively standard game which includes a 3 by 5 symbol display and allows multiple pay lines. An additional game feature embodying the invention is also included in the game, and may take place directly after the main part of the game. The game feature occurs in randomly-selected games, and is invoked directly after the main part of the game if a particular trigger condition appears. The trigger condition may be the random display of a certain symbol or combination of symbols, or it may be a separate random prompt unrelated to the display, depending on how the game is programmed.

In one embodiment of the game feature, a sprite representation of a fairy only becomes visible during the game feature. In another embodiment, the fairy is visible during the main part of the game, and is activated when the game feature is invoked.

In the following description of the game feature embodying the invention, game symbols will be abbreviated as listed below:

| | |
|---|---|
| King | K |
| Queen | Q |
| Jack | J |

Figure 3:
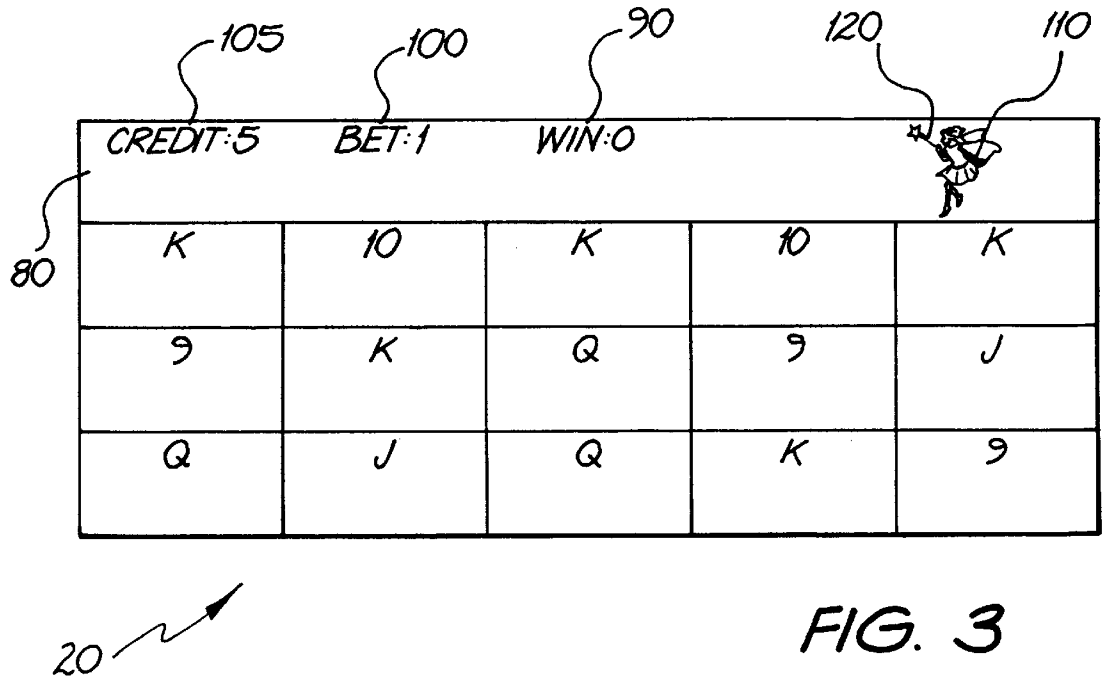
FIG. 3 is a video display of a draw poker machine, showing the sprite (a fairy) which appears at the top of the screen when the game feature is invoked.

When the game feature is first invoked, a sprite representation of a fairy 110 holding a wand 120 appears at the top edge 80 of the screen 20, as shown in FIG. 3, and a special sound associated with the feature is heard. Whenever the game feature results in a win, the normal winning tunes are to be heard while the win meter increments, in the same manner as for the main part of the game. These tunes last for the length of time that the win meter is incrementing. A scorecard for the game feature determines the amount won for a bet of one credit. The number of credits bet on the game feature will be the same as that which was bet on the main part of the game immediately preceding the feature. Winnings from the game feature are added to the amounts which were shown on the credit meter and win meter before the game feature took place. The player may continue to play the main part of the game when wins resulting from the game feature have finished being credited.

Figure 4:
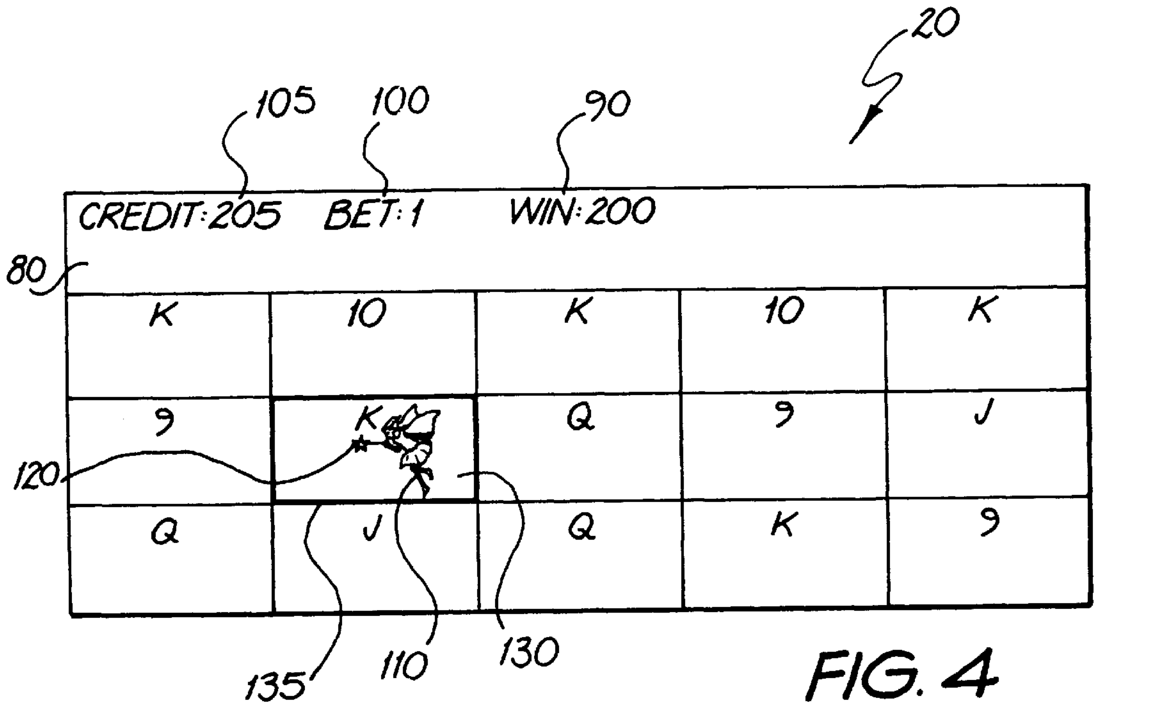
FIG. 4 is a video display with the Scatter Magic game feature, showing an example in which a fairy designates a symbol as being a scatter symbol, resulting in a winning combination.

In the first embodiment of this game feature, referred to as Scatter Magic, as shown in FIG. 4, the fairy moves to a randomly-selected symbol 130 on the display screen 20 and designates it as a scatter symbol by pointing to it with a wand 120. The winning symbol combinations in the game feature are similar to those defined in the main part of the game, the differences being that each winning combination must include the designated scatter symbol, and may be scattered over more than one row of symbols. If the designated scatter symbol turns out to be part of a winning combination, then a win is paid in the same manner as in the main part of the game. In the example shown in FIG. 4, the fairy 110 designates the King in the second column as the scatter symbol, resulting in a win for five Kings according to the scorecard in the main part of the game. In this example, the amount won on the game feature for a 1 unit bet is 200 units, and the win has been added to the initial credit meter reading of 5 units.

In all embodiments of the game feature, when the designated symbol is touched by the wand the designated symbol itself may change into a new symbol, such as that of a scatter symbol in the case of Scatter Magic, or it may simply be highlighted in some way to indicate it will be considered as a the special symbol. In all of the embodiments, the lines delineating the sides of the rectangle 135 (see FIG. 4) surrounding the designated symbol(s) become thicker and change colour when designated by the fairy.

Figure 5:
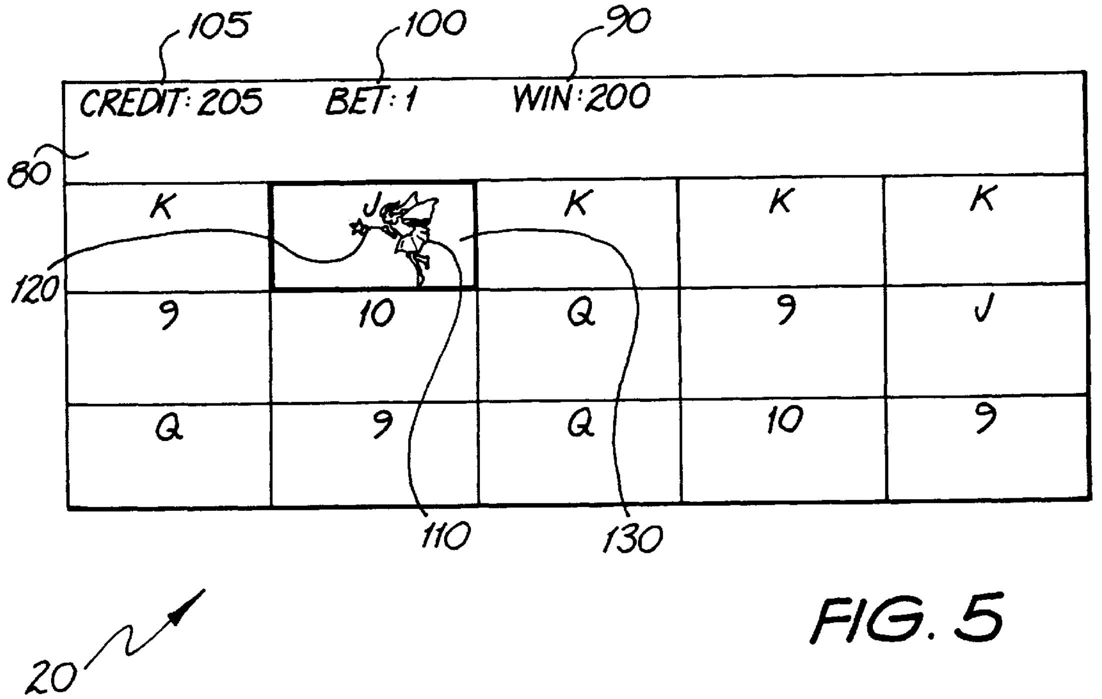
FIG. 5 is a video display with the Wild Wander game feature, showing an example in which a fairy designates a symbol as being a wild card, resulting in a winning combination.

In the second embodiment of the game feature, referred to as Wild Wander (shown in FIG. 5), a sprite representation of a fairy 110 holding a wand 120 at first appears at the top edge 80 of the screen 20, as with the first embodiment. When the game feature is invoked, the fairy moves to a randomly-selected symbol 130 on the screen and designates it as being a wild card symbol by pointing to it with the wand 120. A win is then paid according to the scorecard rules of the main part of the game if this wild card symbol forms part of a winning combination. The symbols in winning combinations must be located in the same row, unlike the first embodiment of the invention. In this example, the amount won on the game feature for a 1 unit bet is 200 units, and the win has been added to the initial credit meter reading of 5 units.

Figure 6A:
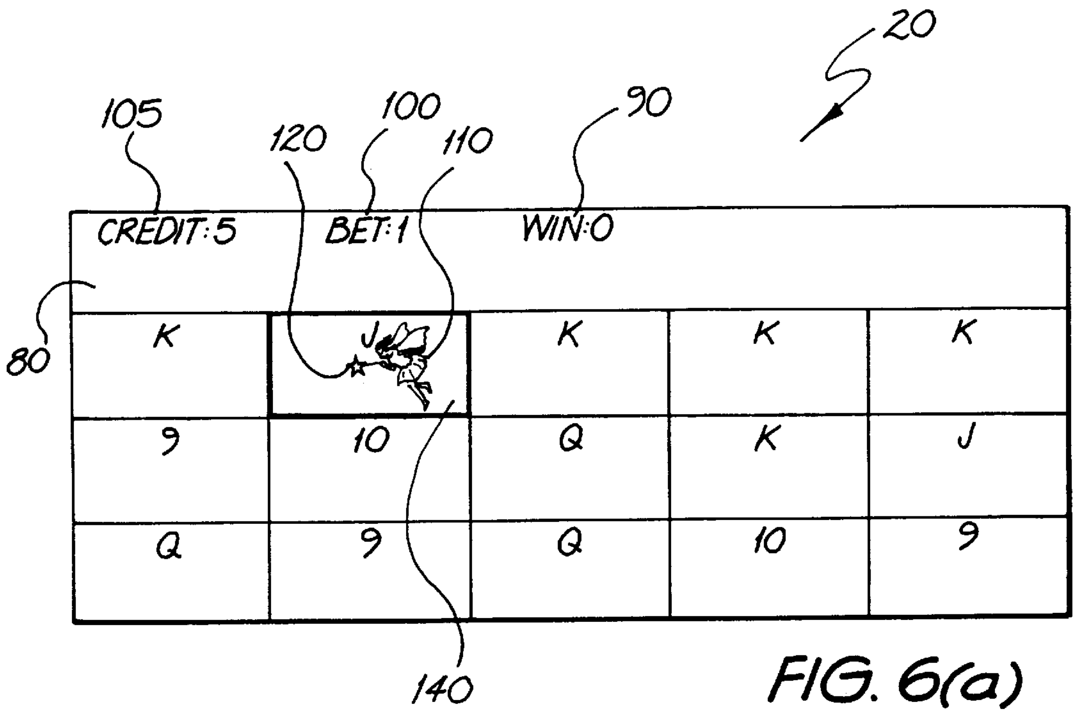
FIGS. 6(*a*)–(*c*) show a third embodiment of the game feature in which the fairy swaps symbols.
Figure 6B:
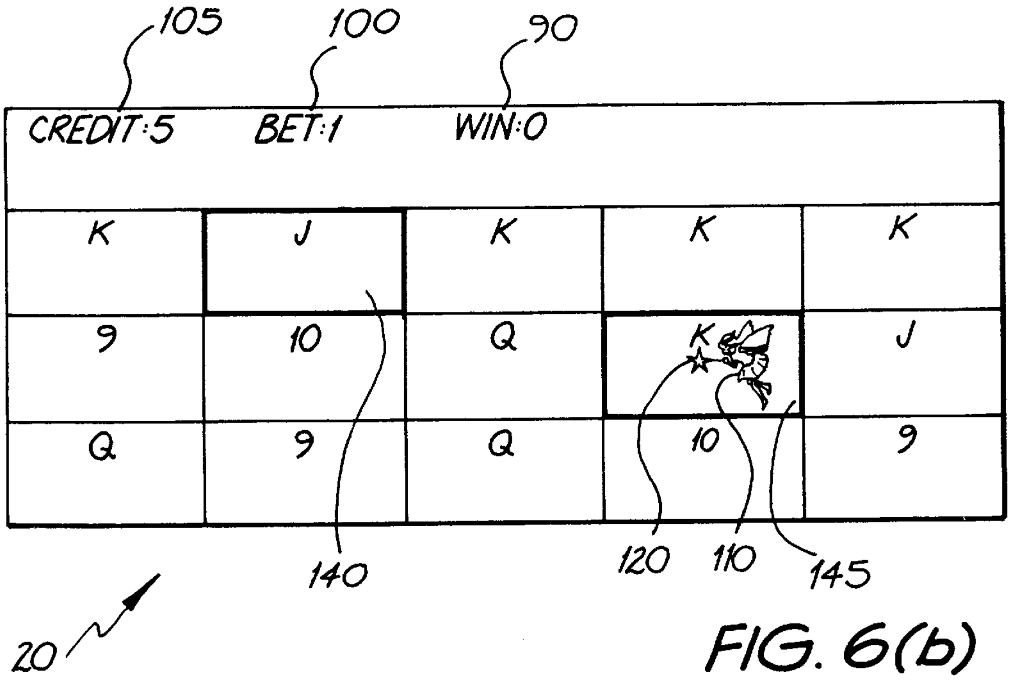
Figure 6C:
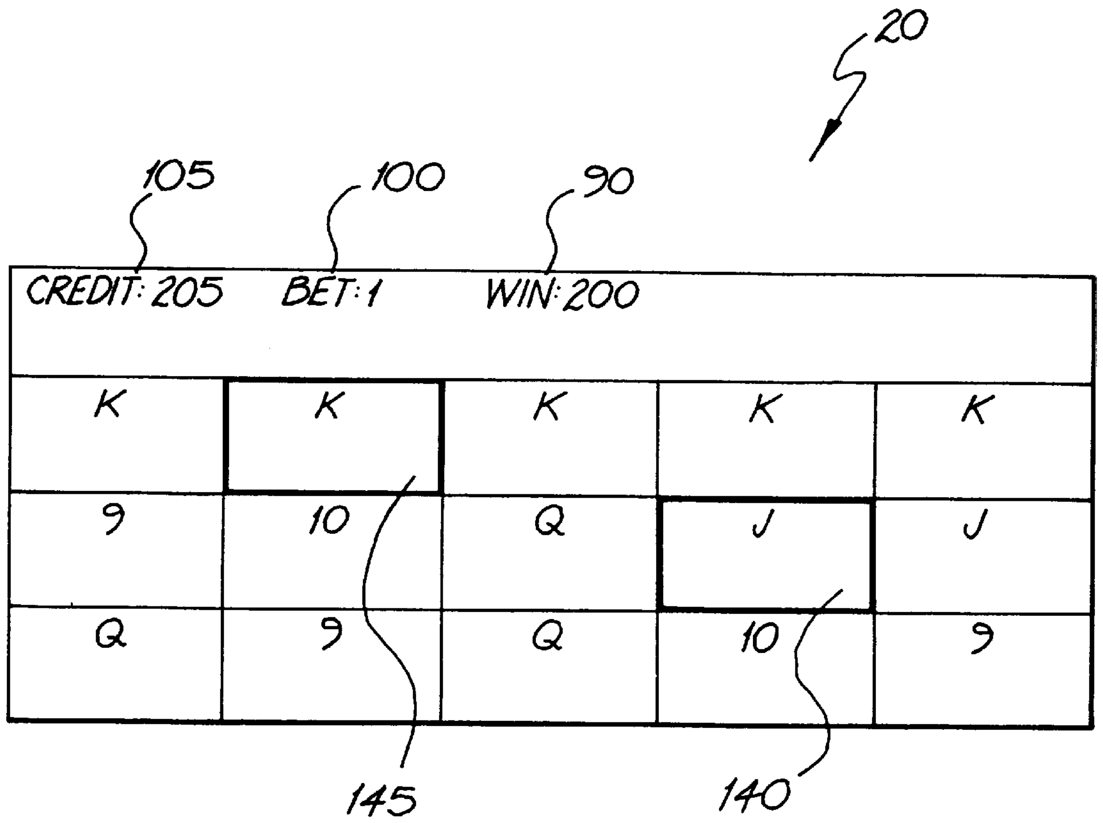

The third embodiment of the game feature is shown in FIGS. 6(*a*)–(*c*). The sprite randomly designates a first symbol 140 (shown in FIG. 6(*a*)), and then randomly designates a second symbol 145 (FIG. 6(*b*)). The locations of the first and second symbols 140 and 145 are then swapped with each other, as seen in FIG. 6(*c*). If this rearrangement of the symbols results in a winning combination, then a prize is paid for the winning combination according to the scorecard rules of the main part of the game.

Figure 7A:
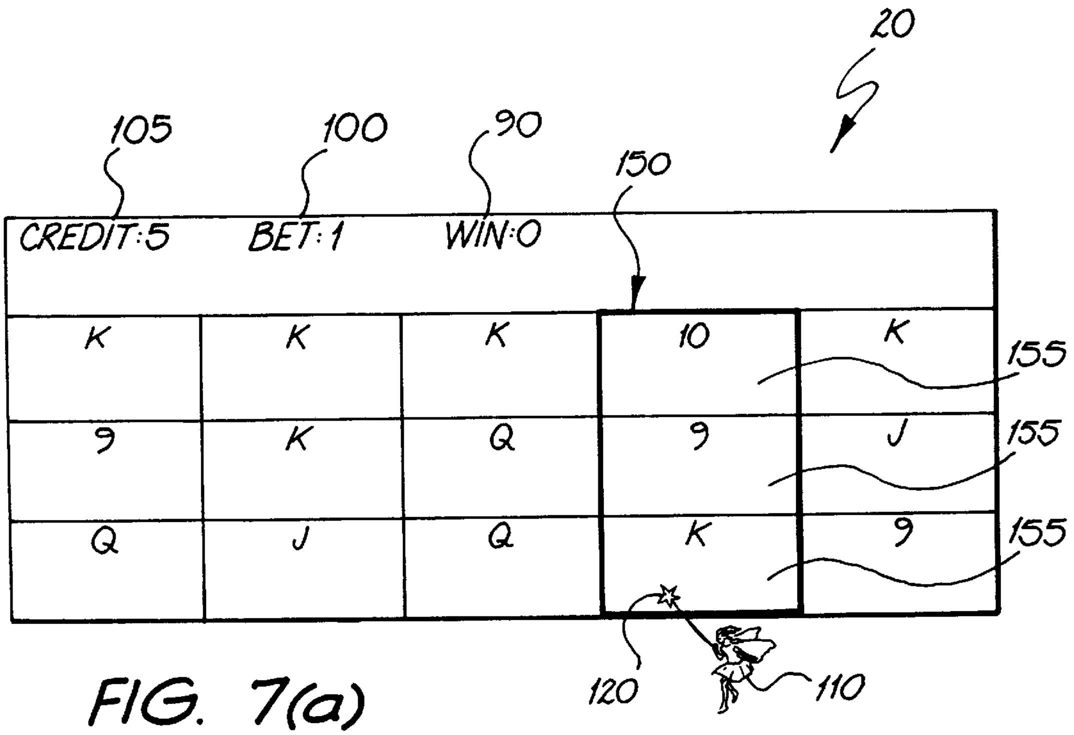
FIGS. 7(*a*) and 7(*b*) show a fourth embodiment of the game feature in which the fairy re-spins a reel.
Figure 7B:
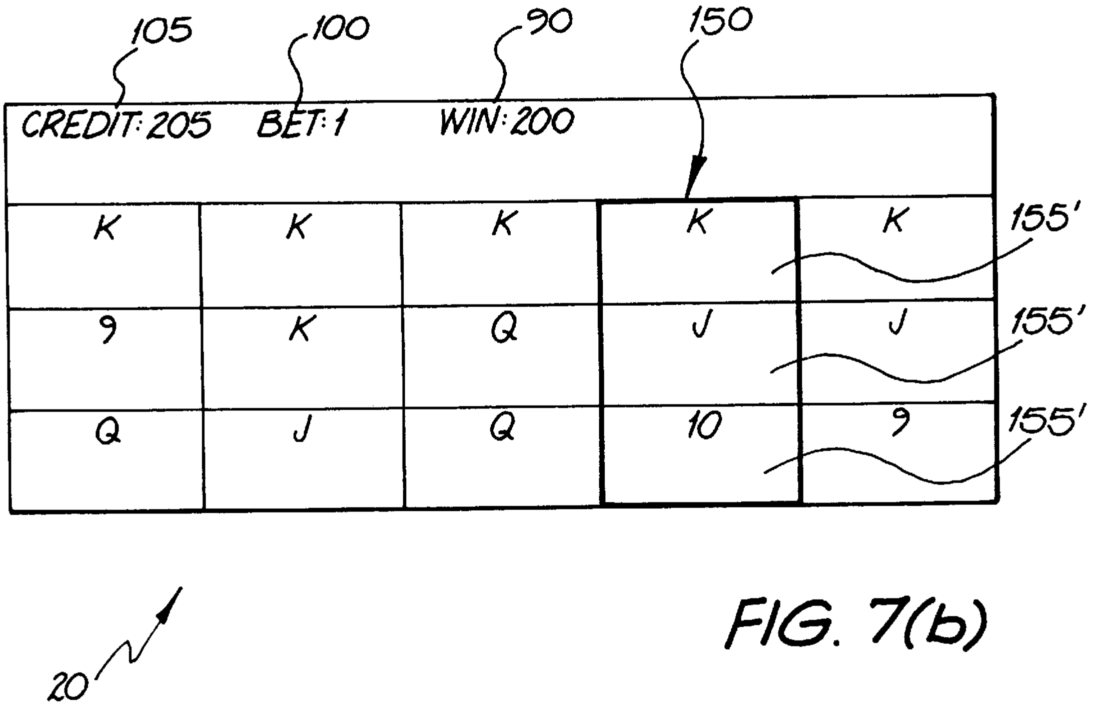

In the fourth embodiment, shown in FIGS. 7(*a*) and 7(*b*), the fairy randomly designates either a row or a column of symbols to be re-spun as though the row or column of symbols were a rotating reel. In this example, the fairy points to a column 150, the fourth column from the left, making the symbols 155 within column 150 appear to be symbols on a rotating reel, and when the simulated rotation finishes, a new randomly-chosen set of symbols 155' appears in the columns. A win is then paid according to the scorecard rules of the main part of the game if the new symbols 155' in the re-spun reel 150 result in a winning combination being formed.

Figure 8:
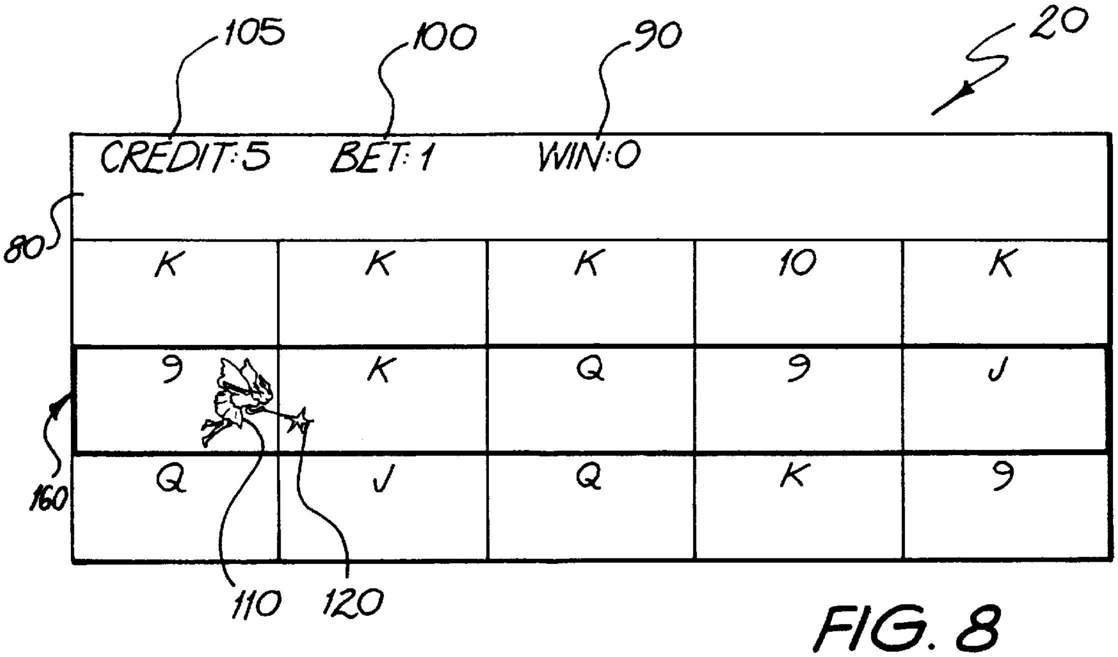
FIG. 8 is a fifth embodiment of the game feature in which the fairy doubles or triples the prize for a designated line.

In a fifth embodiment of the game feature, shown in FIG. 8, the fairy randomly designates a row 160, and if during the next game played (in the main part of the game) a winning combination appears in this row 160, then the prize to be paid will be randomly chosen to be either double or triple the value of the normal prize for the combination according to the scorecard of the main part of the game.

Figure 9:
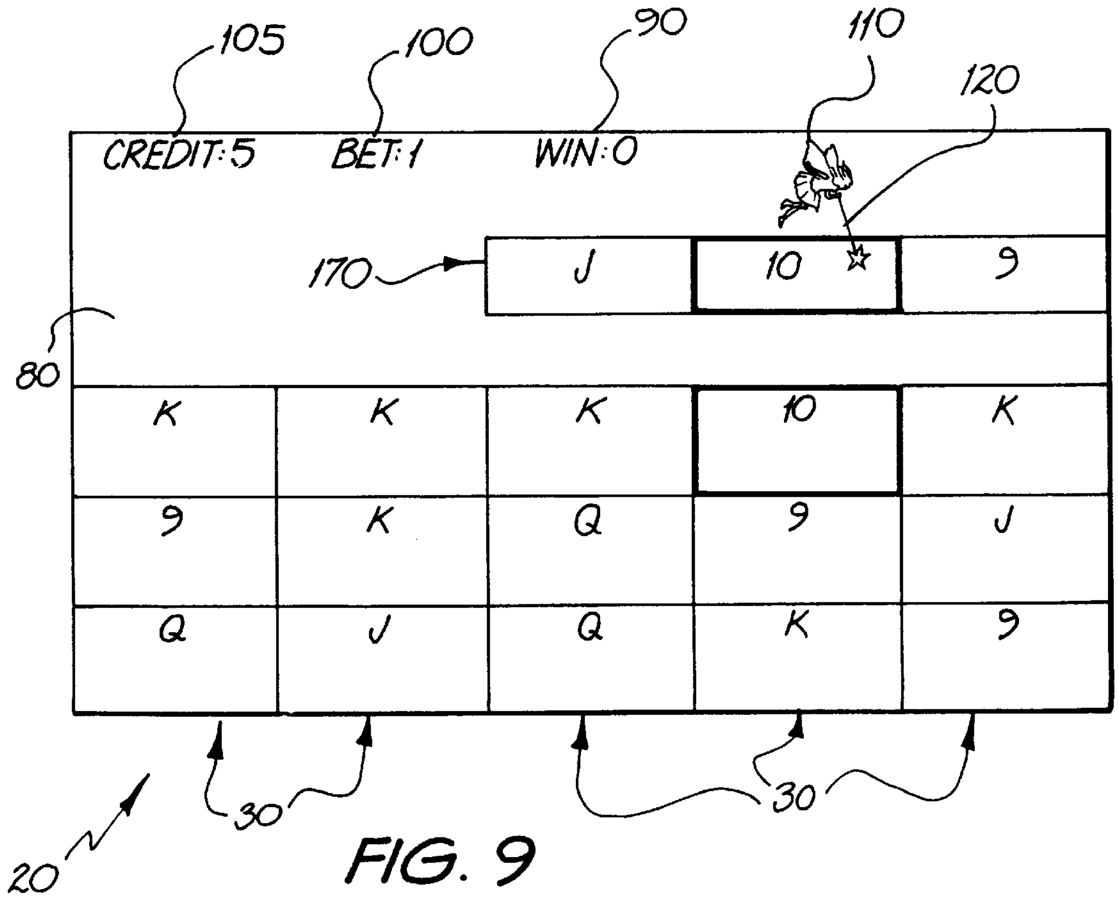
FIG. 9 is a sixth embodiment of the game feature in which the fairy designates special symbols from a separate panel of symbols.

In a sixth embodiment of the game feature, shown in FIG. 9, there is a separate panel 170 of symbols in addition to the usual five rotatable reels 30 which are shown in the other embodiments. In this embodiment, the fairy designates special symbols by pointing to a symbol 175 in the panel 170. Each occurrence of this symbol 175 in the reels 30 will be treated as a special symbol. For example, in FIG. 9 the fairy points to a 'ten' symbol 175 in the panel 170 of symbols, indicating that all of the tens 180 appearing on the rotatable reels 30 will be special symbols. In this embodiment the special symbols are Wild Card symbols, and in a further embodiment the special symbols are Scatter symbols.

Figure 10A:
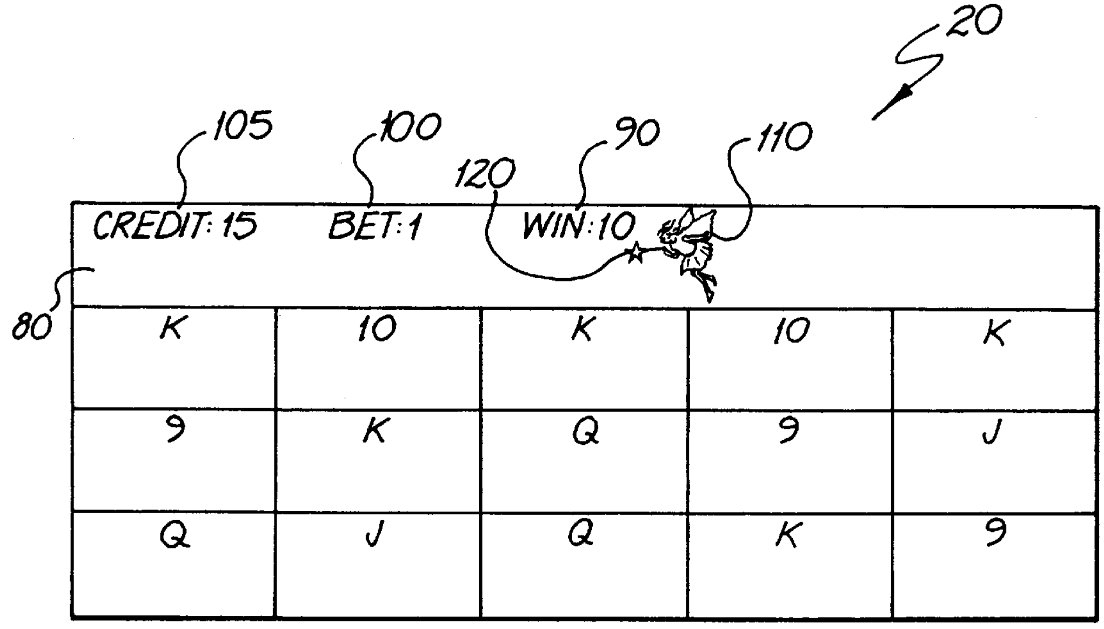
FIG. 10(*a*) and 10(*b*) is a seventh embodiment of the game feature in which the fairy randomly doubles or triples the value shown on the win meter.
Figure 10B:
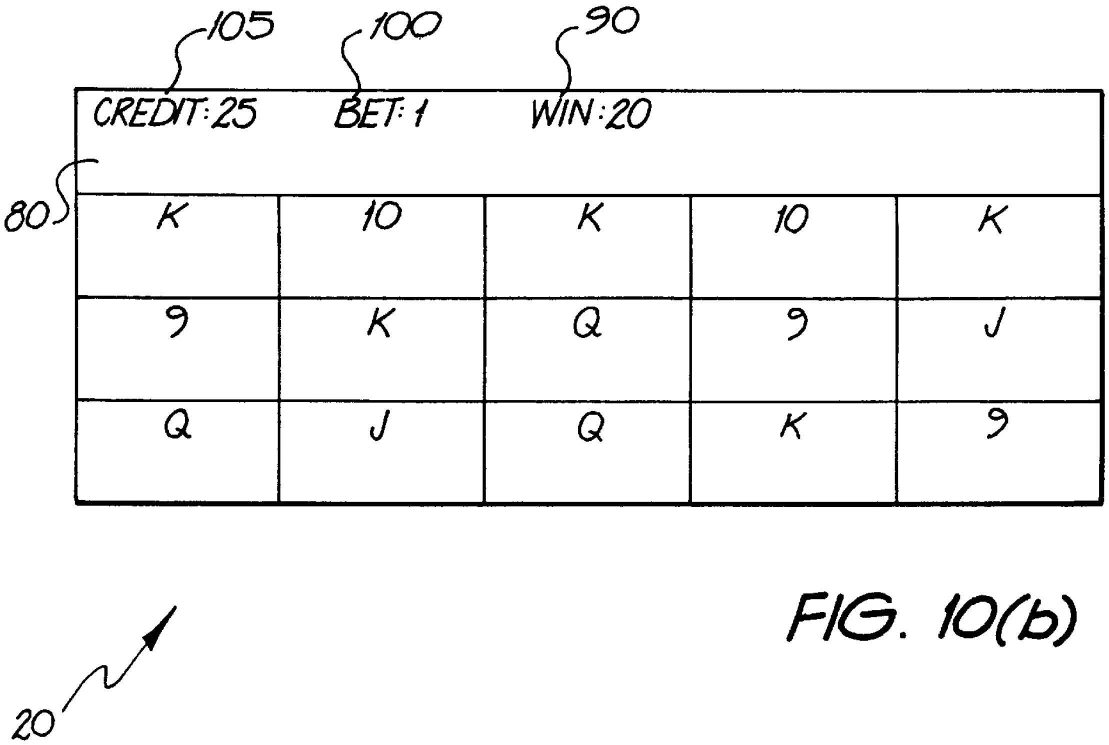

In an eighth embodiment of the game feature, shown in FIGS. 10(*a*) and 10(*b*), a fairy doubles or triples the amount shown on the win meter 90, and the amount shown on the credit meter 105 is increased accordingly. In this embodiment the fairy 110 first touches the win meter 90 with the wand 120. The fairy then disappears (FIG. 10(*b*)), and the original value shown on the win meter 90 doubles or triples and the credit meter has increased accordingly. In the example in FIG. 10(*b*) the original value shown on the win meter 90 doubles from 10 to 20 credits, and the credit meter increases from 15 to 25 credits. In a further embodiment, the fairy touches the credit meter 105 with the wand 120, and the amount shown on the win meter 90 is either doubled or tripled.

Figure 11:
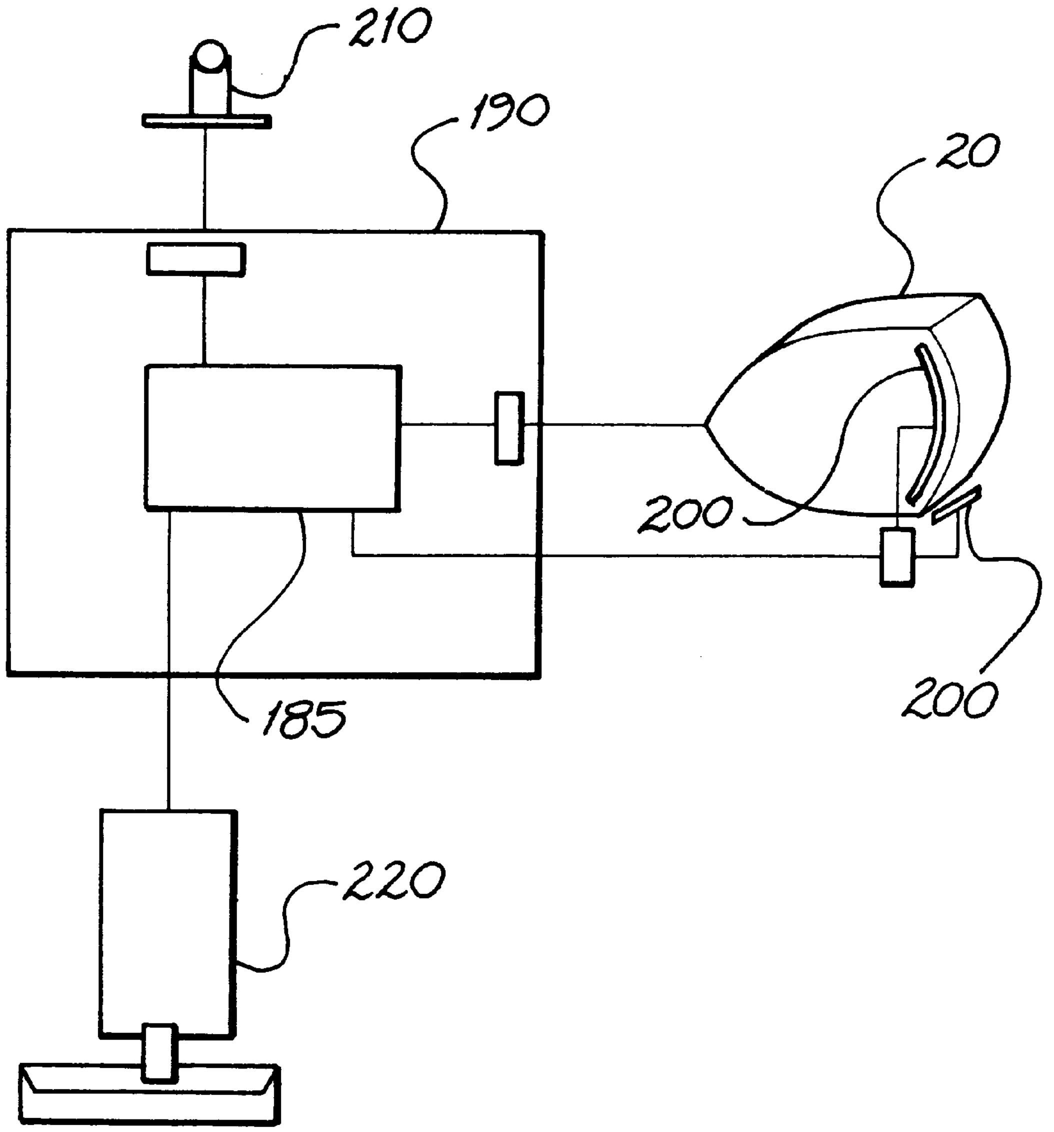
FIG. 11 is a schematic diagram of a slot machine control circuit.

The program which implements the game and game feature is run on a standard gaming machine control processor 185 as illustrated schematically in FIG. 11. This processor forms part of a controller 190 which drives the video display screen 20 and receives touch input signals from touch sensors 200 as well as receiving coin input pulses from a coin chute mechanism 210 and driving a coin payout mechanism 220.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A gaming machine, comprising:

display means; and game control means arranged to play a game, wherein a plurality of symbols are randomly selected from a predetermined set of symbols and displayed in rows on the display means and if a winning combination of symbols results, the machine pays a prize; and upon the occurrence of a predetermined triggering event, a game feature is invoked wherein a sprite randomly designates one or more of the selected symbols displayed on the display means during a game to be treated as special symbols for that particular game, wherein an additional function is associated with each special symbol; and a prize is awarded for any winning combinations formed with one or more of the special symbols; and the remaining randomly selected symbols, before the next randomly selected symbols are displayed, having regard to the additional function associated with each special symbol.

2. The gaming machine as claimed in claim 1, wherein the additional function associated with at least one special symbol is a wild card function.

3. The gaming machine as claimed in claim 1, wherein the additional function associated with at least one special symbol is a scatter award function in which the symbols of each winning combination must include the special symbol and be located in separate columns of symbols but may be scattered over one or more rows.

4. The gaming machine as claimed in claim 1, wherein one or more pairs of the symbols displayed on the display means are randomly-selected to be special symbols, and the additional function associated with the special symbols in each pair is that they are swapped with each other.

5. The gaming machine as claimed in any one of claims 1 to 4 wherein the sprite is a representation of a character which moves across the display means and designates the special symbol.

6. The gaming machine as claimed in any one of claims 1 to 4 wherein, when the sprite designates a symbol, every occurrence of that symbol on the display means is treated as a special symbol.

7. The gaming machine as claimed in any one of claims 1 to 4 wherein symbols are displayed in a separate panel on the display means in addition to the rows of symbols, and when the sprite indicates a particular symbol in the panel, each symbol in the rows of symbols is treated as a special symbol if it matches the particular symbol.

8. A gaming machine; comprising:

video display means; and game control means arranged to play a game, wherein a plurality of symbols are randomly selected from a predetermined set of symbols and displayed in rows on the video display means; and if a winning combination of symbols results, the machine pays a prize, the control means deducting one or more credits from a credit meter as a wager on the game; and if a prize is paid at the conclusion of the game, indicating the prize as a number of credits displayed on a win meter and adding the number of credits displayed on the win meter to the credit meter; and upon the occurrence of a predetermined triggered event, a feature is invoked wherein, independently of a game being played, a sprite moves across the display means and designates the win meter or the credit meter, by touching the respective meter; and wherein the control means increases the amount shown on both the win meter and credit meter by the same amount.

9. The gaming machine as claimed in claim 8, wherein the sprite randomly doubles the amount shown on the win meter.

10. The gaming machine as claimed in claim 8, wherein the sprite randomly triples the amount shown on the win meter.

11. A gaming machine having display means and game control means, the game control means being arranged to play a game wherein a plurality of symbols are randomly selected from a predetermined set of symbols and displayed as a matrix of rows and columns on the display means, and if a winning combination of symbols results, the machine pays a prize, the game being characterised in that the display means displays the predetermined set of symbols on a plurality of simulated rotatable time, the reels being rotated and stopped to display the plurality of randomly selected symbols in the window, and upon the occurrence of a predetermined triggering event, a game feature is invoked wherein a sprite randomly designates one column of the selected symbols displayed on the display means during a game to be treated as special symbols for that particular game wherein the column of symbols is respun to reselect the symbols for the display locations in which the column of special symbols were displayed, and a prize is awarded for any winning combinations formed with one or more of the reselected symbols and the remaining randomly selected symbols, before a next full set of randomly selected symbols are displayed.

12. The gaming machine as claimed in claim 11 wherein the sprite is a representation of a character which moves across the display means and designates the column of special symbols.

13. A gaming machine having display means and game control means, the game control means being arranged to play a game wherein a plurality of symbols are randomly selected from a predetermined set of symbols and displayed in a matrix of rows and columns of display locations on the display means, and if a winning combination of symbols results, the machine pays a prize, the game being characterized in that upon the occurrence of a predetermined triggering event, a game feature is invoked wherein a sprite randomly designates one row of the matrix of rows and columns of locations on the display means to be treated as special locations for the next game wherein winning combinations of symbols displayed in the row of special locations in said next game are awarded a prize which is either double or triple the value of a prize awarded to the same combination when displayed in locations that are not treated as special.

14. The gaming machine as claimed in claim 13 wherein the sprite is a representation of a character which moves across the display means and designates the row of special symbols.

* * * * *